(12) United States Patent
Olsen

(10) Patent No.: US 6,451,553 B1
(45) Date of Patent: Sep. 17, 2002

(54) METHOD FOR THE SEPARATION OF FLOUR

(75) Inventor: Hans Sejr Olsen, Holte (DK)

(73) Assignee: Novozymes A/S, Bagsvaerd (DK)

(*) Notice: Subject to any disclaimer, the term of this patent is extended or adjusted under 35 U.S.C. 154(b) by 180 days.

(21) Appl. No.: 09/657,704

(22) Filed: Sep. 8, 2000

Related U.S. Application Data

(60) Provisional application No. 60/153,563, filed on Sep. 13, 1999.

(30) Foreign Application Priority Data

Sep. 8, 1999 (DK) .......................... 1999 01269

(51) Int. Cl.$^7$ .............................. C12P 21/06; A23J 1/12; A23J 3/18
(52) U.S. Cl. .................. 435/68.1; 435/71.1; 435/41; 435/272; 435/267; 530/374; 530/375; 530/376
(58) Field of Search .................. 435/68.1, 71.1, 435/41, 272, 267; 530/374, 375, 376

(56) References Cited

U.S. PATENT DOCUMENTS

| | | |
|---|---|---|
| 3,951,938 A | 4/1976 | Kerkkonen et al. |
| 4,217,414 A | 8/1980 | Walon |
| 5,108,765 A * | 4/1992 | Maat et al. .................. 426/20 |

FOREIGN PATENT DOCUMENTS

| | | |
|---|---|---|
| EP | 0 730 829 A2 | 9/1996 |
| GB | 2 032 245 A | 5/1980 |
| WO | WO 96/39851 | 12/1996 |

OTHER PUBLICATIONS

Weegels, J.P. Marseille et al, 1992 Starch/StorRKE, pp. 44–48.

Claus, Christophersen et al, 1997, Starch/StorRKE, pp. 5–12.

\* cited by examiner

*Primary Examiner*—Francisco Prats
(74) *Attorney, Agent, or Firm*—Elias J. Lambiris

(57) ABSTRACT

The present invention relates to a method for the separation of flour into one gluten fraction and at least one other fraction, comprising the steps of: mixing the flour and a liquid to obtain a dough, separating the dough into a fraction comprising gluten and at least one other fraction, recovering at least the gluten fraction, wherein an oxidoreductase is added at any of steps a), b) or c).

21 Claims, 2 Drawing Sheets

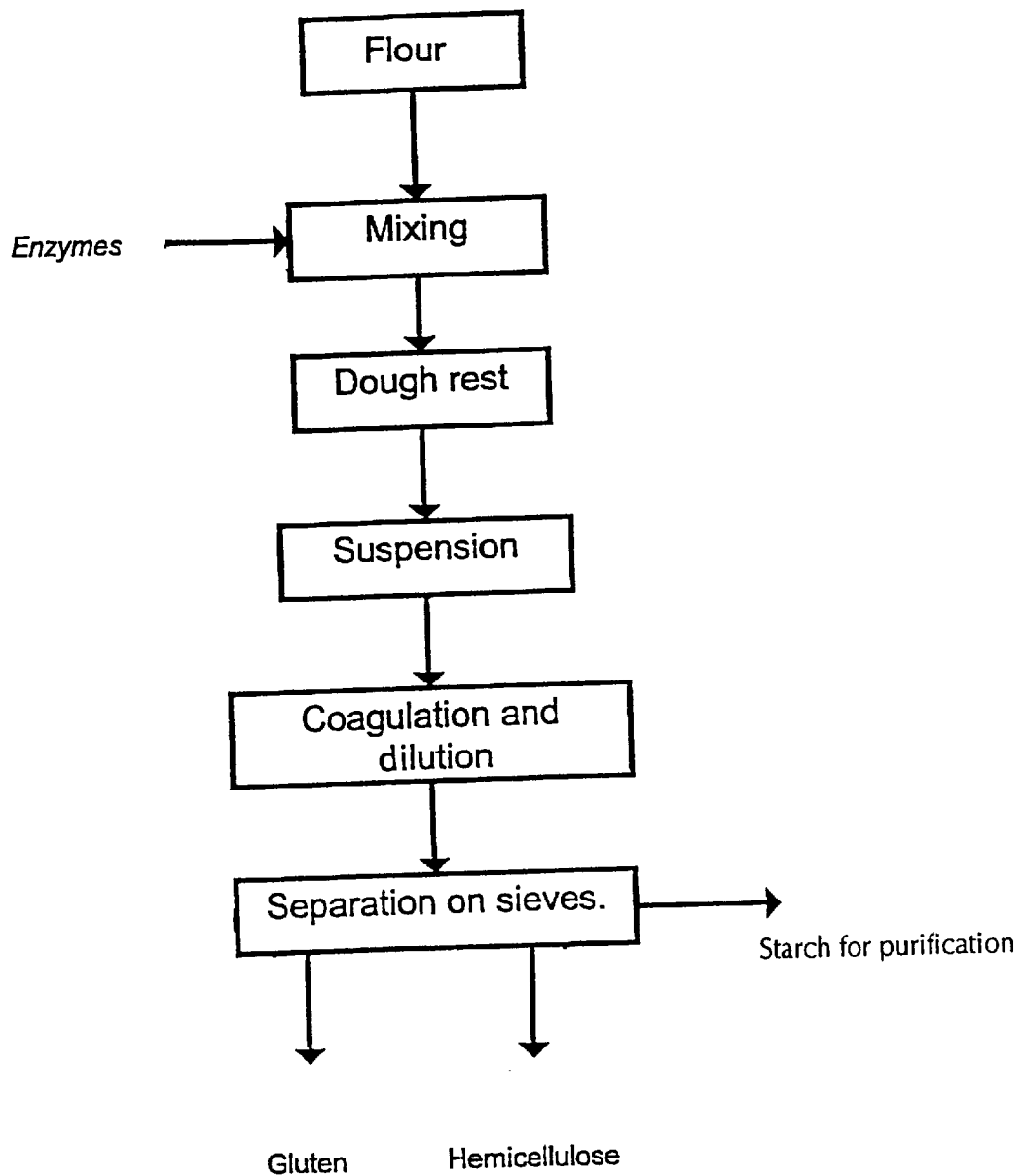
Figure 1. Dough or batter process with enzyme treatment.

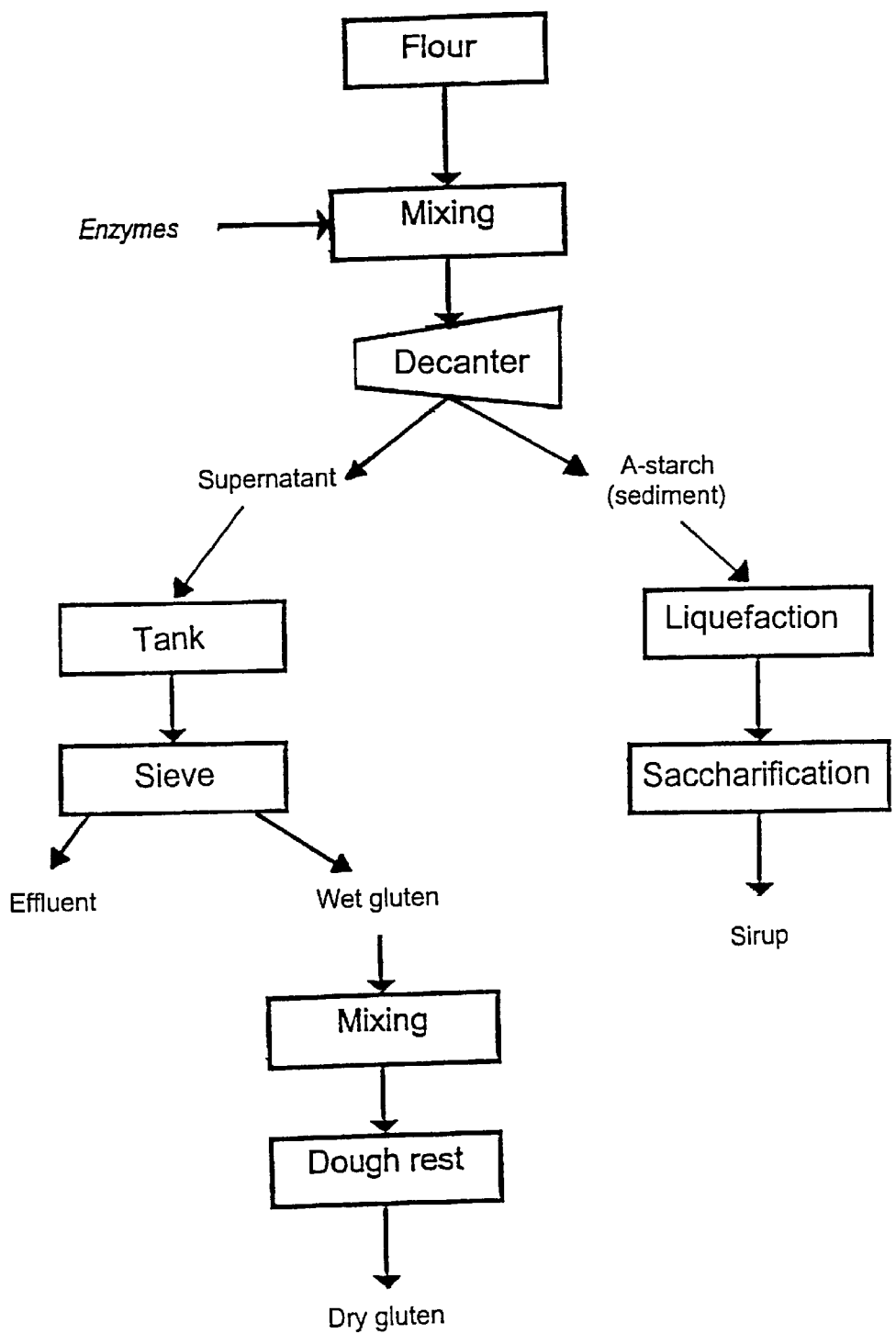
Figure 2. Decanter process for the separation of wheat

METHOD FOR THE SEPARATION OF FLOUR

CROSS-REFERENCE TO RELATED APPLICATIONS

This application claims priority under 35 U.S.C. 119 of Danish application no. PA 1999 01269 filed on Sep. 8, 1999, and U.S. provisional No. 60/153,563 filed on Sep. 13, 1999, the contents of which are fully incorporated herein by reference.

The present invention relates to the field of flour separation. The invention discloses a method for the separation of flour, in particular wheat flour, compositions for the separation of flour and the use thereof. Further the invention relates to a fraction consisting essentially of gluten, and a product comprising said fraction.

BACKGROUND OF THE INVENTION

The industrial implications of flour and the products obtained from its separation are receiving increasing attention. Flour may be separated into fractions of starch, gluten and fibres. In the separation of flour the very nature of the flour protein, i.e., gluten, as being water insoluble presents a challenge desirable to overcome.

Gluten consists primarily of the proteins, glutenin and gliadin. Upon hydration and during processing gliadin and glutenin interact to form a network. Proteins of wheat flour form a network with disulphide bridges (S-S-bridges). The network is stronger, the more sulphur bridges are present. The network entraps carbon dioxide formed during fermentation creating the characteristic elasticity of the wheat flour dough. The elastic properties of gluten are due to the glutenin fraction and the viscous properties come from the gliadin fraction. It is therefore a fact that the quality of the flour for the purpose of baking is highly dependent on the amount of gluten contained in the flour. Gluten may be added to flour of poor quality to improve the baking properties of the flour.

Prior art attempts to separate wheat flour have been made. U.S. Pat. Nos. 4,217,414, 3,951,938 and UK 2 032 245 all describe examples of methods for the separation of wheat flour and the recovery of wheat gluten. Here the separation of wheat flour into gluten and starch fractions are performed by the means of mechanical processing. The mechanical separation methods described in the references are centrifugation, screening, decanting or milling.

The application of mechanical techniques of separation provided for fractions of gluten and starch. However, to obtain less contaminated fractions effort was directed toward improving the purity of the fractions.

The addition of enzymes to the flour or dough proved to be a successful way of achieving an improved separation. The added enzymes are capable of reacting with the flour and thereby improve the separation quality of the gluten.

In the prior art numerous references disclose such use of gluten improving enzymes. Among those are Weegels et al. (Weegels, P. L., Marseille, J. P., and Hamer, R. J., 1992, Starch/stärke 44, 2, pp. 44–48) who describe the use of enzymes as a processing aid in the separation of wheat flour into starch and gluten. The enzymes mentioned are lipase, hemicellulase and cellulase.

Further, Christophersen et al. (Christophersen, C., Andersen, E., Jakobsen, T. S., and Wagner, P., Starch/Stärke, 1997, 49, pp. 5–12) describe the successful use of a xylanase to improve the yield of gluten and starch, without apparent negative effects on the gluten quality.

Formerly it has not been possible to obtain gluten fractions from prior art processes of flour separation having a high content of pure protein, such as gluten fractions consisting essentially of gluten, having a very low content of starch or fibres of the xylan or arabinoxylan type.

SUMMARY

It is an object of the present invention to provide for a method for the separation of flour, in particular wheat flour, into one gluten fraction and at least one other fraction, comprising the steps of:
   a) mixing the flour and a liquid to obtain a dough,
   b) separating the dough into a fraction comprising gluten and at least one other fraction,
   c) recovering at least the gluten fraction, characterized in that an oxidoreductase is added at any of steps a), b) or c).

In another aspect the invention relates to a method for the separation of flour into one gluten fraction and at least one other fraction, comprising the steps of:
   a) mixing the flour and a liquid and at least one oxidoreductase enzyme obtaining a dough,
   b) separating the dough into a fraction comprising gluten and at least one other fraction,
   c) recovering at least the gluten fraction.

It should be mentioned that the method can also be carried out as described above where the oxidoreductase(s) in question is(are) added to the (dry) flour. If the oxidoreductase(s) in question has(have) been added to the flour the oxidoreductase(s) has(have) time to react with $O_2$ (e.g., from the air or by addition of pure $O_2$) to provide a flour composition with the desired gluten quality.

The present invention permits the separation of gluten from any quality of flour, in particular wheat flour, even from flour of poor quality, such as flour used for fodder.

Thus advantages of the invention may include improved yields, more pure gluten and/or higher quality of gluten.

By the present method an improved separation of flour, in particular wheat flour, is obtained. The improvement in the separation of the flour increases the yield of gluten and starch fractions by providing a more efficient method of separation. Further according to the invention the separated gluten is of a higher quality, (i.e. less contaminated with other flour components, such as starch or fibres) than gluten fractions obtained according to the prior art.

Further the invention relates to a composition for the separation of flour, in particular wheat flour, into one gluten fraction, and at least one other fraction, comprising at least one oxidoreductase enzyme.

The compositions of the invention may be used for the separation of flour, in particular wheat flour.

In a further aspect the invention relates to a flour composition comprising any of the oxidoreductases mentioned below.

The gluten fraction obtained may be added to flour to increase the gluten content, such as to enhance poor quality flour, and thereby improving the baking quality of the flour.

DRAWINGS

FIG. 1 shows an example of the steps of a process on wheat flour for preparation of a dough, starch extraction and the separation on sieves.

FIG. 2 shows an example of the steps of a process on wheat flour for preparation of a homogenized batter (thinned dough) and separation by the means of a decanter centrifuge.

DETAILED DESCRIPTION OF THE INVENTION

Due to the significance of the industrial applications of flour, in particular wheat flour, much attention is given to the development of separation methods for flour. The present invention reveals a method for the improved separation of flour, in particular wheat flour, into starch and gluten by using oxidoreductase enzymes, whereby gluten of a high quality is obtained.

The two main components of flour, such as wheat flour, are gluten and starch. After separation the vitality of gluten is preserved due to controlled drying. When hydrated, the dried gluten must possess the same vitality as the fresh gluten. The vitality of the separated gluten may be determined by the means of gluten vitality tests, such as the farinograph test, or the SDS (sodium dodecyl sulphate) sedimentation test used to determine the degree of denaturation of the gluten. The denaturation of the gluten may occur during the drying step, and great care must therefore be taken to ensure a gentle drying procedure.

Yet, a further parameter correlating to the vitality of gluten is the protein dry matter ratio, describing the purity of the gluten. The higher the amount of protein of dry matter, the better the quality of gluten. In the present context the term "protein" is meant to equal the term "gluten". The purity of the gluten may be determined by applying the Kjeldahl analysis, and a dry matter determination analysis.

Gluten may be used in the food industry, such as in bakery products, pet foods, meat products and as mentioned above in flour fortification. In the case of the latter application it is important that the gluten creates a visco-elastical dough ball, having good elasticity and extensibility properties, and that it is capable of cohering to a wide variety of products, thereby improving texture, strength and nutritional content of the food item in question.

In the baking industry, a high vitality of gluten is correlated with a high baking quality, i.e., a high bread volume. The higher the denaturation degree, measured by the methods described above, the lower the vitality of the gluten, and the lower the baking quality. Further, the higher the amount of protein of dry matter, measured as mentioned above, the better the baking quality.

By applying the method of the present invention it is possible to obtain a gluten fraction consisting essentially of gluten, i.e., higher purity of gluten fraction. In the present context the term "consists essentially of" is meant to define a fraction wherein the content of gluten is at least 80% protein of dry matter. In a preferred embodiment the gluten content is at least 90%, more preferred 95%, even more preferred 97% protein of dry matter, even more preferred 99 protein of dry matter, and in an even most preferred embodiment the gluten fraction is consisting of protein only (i.e., gluten only—100%). The method of the invention additionally provides for an increased yield of gluten from, e.g., wheat independent of the crop variety. The method may be applied to any kind of crop. However, especially contemplated are wheat, but also crops such as corn, rice, sorghum bean, barley, rye, or fruit hulls are contemplated.

Wheat

Modern wheat varieties are classified as winter wheat and spring wheat. Wheat varieties may be hard grained or soft grained. Hard grained varieties normally have a large content of gluten. The flour of the latter varieties is preferably used in the baking industry for making products, such as bread. In case of the soft grained wheat varieties the flour thereof may be used for the production of cakes, biscuits, and fodder Durum wheat is hard grained and the flour is used for pasta products. Wheat in general may also be used for the manufacture of beer and whiskey. Independent of the wheat variety the present method has improved the gluten yield obtainable from said soft varieties. Besides gluten another main wheat component is starch.

Gluten Quality

Wheat starches are classified according to their degree of purity. The grades are denominated A and B, respectively. Grade-A starch has a particle size of 20–35 microns and grade-B starch has a particle size of 2–10 microns. Grade-A starch is a versatile product providing strength and a pleasing texture to a variety of foods. Low levels of protein and fibre insure that grade-A starch gelatinise at low temperatures producing a smooth paste. The paste may be applied to foods such as, baby food, soups, sauces, gravies, sour cream, and dips. Grade-B starch has a higher protein content and a lower density.

Application of starches

There are a vast number of areas in which starches may be applied, such as in glucose syrup production and in sweetening production in general.

According to this invention at least one other fraction is obtained, said fraction comprising starch and optionally other wheat constituents, such as fibres. Preferably, the at least one other fraction consists essentially of no gluten.

Accordingly, the other fraction(s) of the present invention consist of essentially no gluten. By the term "essentially" is meant that the gluten content in the other fractions are less than 20%, preferably less than 10%. In a more preferred embodiment at least two fractions are obtained, one of said other fractions being a starch fraction. The starch fraction is substantially free of gluten and also substantially free of wheat constituents, being an essentially pure starch fraction.

It is an object of the invention to obtain a substantially pure starch fraction.

The method is conducted by mixing flour, in particular wheat flour, and a liquid, said liquid being acceptable in products intended for animal and human consumption, and an oxidoreductase enzyme.

The mixing may be carried out using any suitable method known in the art, which may be by the use of an electrically operated mixer. In a preferred embodiment of the invention water is preferred as a liquid.

The mixing may be conducted by mixing the flour and the enzyme in a first step, followed by the addition of the liquid.

Furthermore, the enzyme(s) of the invention may be in a dry form or in a liquid form, and may be applied to the flour as such, dependent on the requirement of the timing of the separation process as described below.

In one embodiment of the invention the flour is mixed with the enzyme(s) in a dry form. This method allows for the preparation of flour and enzyme(s) mixture that may not be further processed immediately after mixing, but may in fact be kept for use at a later point in time. As the process is desired to proceed, in a second step the liquid may be added to the flour and enzyme(s) mixture.

In another embodiment the flour may be mixed with the enzyme(s) in a liquid form. By doing so the enzyme reaction (s) may begin immediately after the mixing, and may thus be fully complete by the time the flour separation process is meant to continue by, in a second step, adding the liquid. When adding the enzymes in a dry form the holding time for the flour and enzyme mixture may be up to 3 months, such as up to six months, or longer dependent on the type of enzymes applied and physical parameters, such as storage conditions, humidity and temperature. By using this procedure the resting time may be minimised, preferably eliminated once the actual separation process begins, due to the fact that the enzyme reaction by then may be partly or fully completed, again dependent on the parameters mentioned above.

In a further embodiment of the invention the flour and the liquid are mixed in a first step obtaining a slurry, and whereto in a second step the enzyme(s) are added. This provides for the initiation of the immediate action of the enzyme(s) according to the invention, in the wheat separation process.

Accordingly, the flour mixture (i.e., flour and enzymes) of the invention may be dry or it may be liquid. In case of the former it is advantageous that the enzyme preparation is a dry product, e.g., a non-dusting granulate, whereas in the latter case the enzyme preparation may be in liquid form.

For the enzyme reaction(s) of the invention to occur oxygen must be present. The level of oxygen present must be sufficient to ensure the reaction to take place, i.e., oxygen may not be the limiting factor of the chemical reaction.

According to the invention in one embodiment step a) may comprise mixing the flour and a liquid obtaining a dough, resting the dough, and adding at least one oxidoreductase enzyme to the dough.

The time needed for resting the dough may be any suitable time. The resting time may be dependent upon the method chosen to mechanically process the dough for the purpose of obtaining individual fractions of gluten and starch, or it may depend upon the crop (e.g., wheat) variety used.

In yet another embodiment of the present invention step a) may comprise mixing the flour and a liquid and the at least one oxidoreductase enzyme obtaining a dough, followed by resting the dough prior to the separating step b) of the invention.

In a further embodiment of the invention the dough is diluted prior to the separating step b). The dilution of the dough may be in the order of 1.5:1, preferably 2:1.

The term "dough" in the present context is meant to be distinguished from the term "batter", the latter containing more liquid than dough, such as 3 to 4 times more liquid than dough. Accordingly, the diluted dough of the invention may be referred to as batter.

In the present context, the term "oxidoreductase" includes enzymes capable of creating S—S (sulphur-sulphur) bridges in gluten, or making reduction and exchange between chains thereby creating a network. The oxidation reaction is as follows: SH—$O_2$→S—S and the reduction reaction is as follows: S—S→SH. The enzymatic activity of the enzymes according to the invention may be determined by standard assays.

According to the invention the enzymes may be selected from the group consisting of Peroxidase (EC 1.11.1.7), Tyrosinase (EC 1.14.18.1), Catechol oxidase (1.10.3.1), Laccase (EC 1.10.3.2), Bilirubin oxidase (EC 1.3.3.5), (Glutathione oxidase=vb Sulfhydryl oxidase (EC 1.8.3.3), Glucose oxidase (EC 1.1.3.4), Pyranose oxidase (EC 1.1.3.10), Hexose oxidase (EC 1.1.3.5), L-amino acid oxidase (EC 1.4.3.2), Lysyl oxidase (EC 1.4.3.13), xylitol oxidase, galactose oxidase (E.C. 1.1.3.9), alcohol oxidase (E.C. 1.1.3.13) alone or in combination. The oxidoreductase(s) in question should be added in an effective amount.

Dependent on the flour and the purpose of the use of the product, the enzymes may be applied alone or in combination. The enzymes of the invention may be applied to the flour mixture alone or the enzymes may be applied in combination with another enzyme, such as an enzyme selected from the group consisting of hemicellulase, cellulase, xylanase, proteases or dehydrogenases.

The pH value is preferably within a range suitable for the enzymatic activity. In one embodiment of the invention the dough has a pH value of between 4.5 and 8.0, preferably between 5.0 and 6.5. It is preferred that the pH is the non-regulated pH of the slurry and dough, and that no pH regulators are added.

Further, according to the invention the temperature of the dough or slurry is preferably between 10–60° C., more preferably between 20–50° C., and most preferably between 35–45° C.

When the mixing step is accomplished the dough obtained is subjected to a separating step.

The separating step may be conducted by a variety of methods suitable for the separation of the dough of the invention, i.e., the separating method may rely on differences in particle size between gluten and starch (fibres) and thus rely on particle weight.

In one widely used embodiment of the invention the dough is separated by the means of centrifugation. According to this method the dough is centrifuged thereby obtaining a heavy phase containing pure starch and a free flowing light phase containing the gluten.

In another embodiment of the present invention the separating process is performed by the means of screening. The screening may be conducted by arranging at least a gluten screen, for obtaining the gluten fraction. The screen size may vary dependent on the nature of the material to be screened.

For example the screen for gluten may have the size of $500\mu$, or $400\mu$, or $200\mu$, or $125\mu$. The screening method may furthermore comprise two or more screens, the first for gluten, and the other(s) for one or more starch fractions and/or fibre fractions.

It is of importance that the screens are adapted to the gluten particle size, which is regulated by the enzymatic treatment during the mixing step.

The screening method is preferably conducted with diluted dough, whereby the starch and fibres are washed through the gluten particle network, leaving the gluten particles on the first screen.

In another embodiment of the present invention the separating process is performed by the means of decanting. The decanting process may begin by homogenising the batter in a homogeniser. Here shear forces break up the matrix. After this the mixture is passed through a decanter centrifuge capable of separating the dough into distinct phases, such as starch and gluten phases. The gluten phase may be further processed by additional washing and centrifugation or screening.

Yet another method of separating according to the invention may be air classification. In this method the wheat flour is separated into fractions, i.e. starch and gluten, by passing the flour through a spiral air stream. The particles in the flour will separate according to size, resulting in starch and lo gluten fractions. This method may advantageously be applied to the separation of the stored flour and enzyme(s) mixture described earlier.

In another aspect of the present invention separating process is by the means of a hydrocyclone. In the hydrocyclone apparatus the diluted mixture is applied to the top of a static cone shaped container. The mixture is rotating inside the container and the heavier particles will settle in the lower fraction of the mixture, whereas the lighter particles will be present in the top fraction of the mixture.

The methods applied for the separating process may be one method, or it may be a combination of more processes.

The separating step is followed by a recovering step, wherein the gluten fraction is recovered. The gluten fraction thus obtained may be kept as a suspension of gluten in a liquid or it may subsequently be dried. The latter provides for the option of processing and storing the gluten for later purposes. It is an object of the invention that the separated gluten maintains its characteristic properties, having properties identical to the original gluten. The drying step is especially crucial for the conservation of the gluten properties. Too forceful a drying process may result in a considerable loss in gluten quality.

According to the invention the gluten may be dried in a ring dryer, or it may be dried in a fluid bed dryer. In the ring dryer process the wet gluten is fed into a ring duct after a size reduction in a disintegrator. Upon entering the ring duct the gluten is mixed with circulating gluten particles that are already partially dried. Dried gluten particles are removed s from the ring by a manifold. The principle behind the fluid bed dryer is similar to the ring dryer, except the fluid bed dryer is arranged horizontally and air is entering the bed from below.

In a preferred embodiment at least one starch fraction is obtained, which fraction(s) may be further processed as applicable.

The present invention further relates to a composition for the separation of wheat flour into one gluten fraction and at least one other fraction, comprising at least one oxidoreductase enzyme.

The composition is preferably suitable for mixing with the flour as described above.

According to the invention the composition may comprise any of the oxidoreductase enzymes described above alone or in combination. Furthermore, the composition may comprise at least one other enzyme. Said other enzyme may be an enzyme for enhancing the gluten separation, e.g., an enzyme with affinity to the non-starch carbohydrate fractions, fibres or soluble arabinoxylan fractions.

The more specific combination of components for the composition according to the invention is dependent upon the type of flour used for the separation, and upon the purpose of the application of gluten obtained by the invention.

According to the invention the enzymes may be from fungal (including filamentous fungi and yeasts) or bacterial origin.

The enzymes may be derived from the bacterial strain(s) of strains of the order Actinomycetales, e.g., *Streptomyces spheroides* (ATTC 23965), *Streptomyces thermoviolaceus* (IFO 12382) or *Streptoverticillum verticillium* ssp. *verticillium*; strains of Bacillus sp., e.g., *Bacillus pumilus* (ATCC 12905), *Bacillus stearothermophilus, Rhodobacter sphaeroides, Rhodomonas palustri, Streptococcus lactis, Pseudomonas purrocinia* (ATCC 15958) or *Pseudomonas fluorescens* (NRRL B-11); or strains of Myxococcus sp., e.g., *M. virescens*.

Further the enzymes may be derived from the fungi strains belonging to the subdivision: Deuteromycotina, class Hyphomycetes, e.g., Fusarium, Humicola, Tricoderma, Myrothecium, Verticillum, Arthromyces, Caldariomyces, Ulocladium, Embellisia, Cladosporium or Dreschlera, in particular *Fusarium oxysporum* (DSM 2672), *Humicola insolens, Trichoderma resii, Myrothecium verrucana* (IFO 6113), *Verticillum alboatrum, Verticillum dahlie, Arthromyces ramosus* (FERM P-7754), Caldariomyces fumago, *Ulocladium chartarum, Embellisia allior Dreschlera halodes*; strains belonging to the subdivision Basidiomycotina, class Basidiomycetes, e.g., Coprinus, Phanerochaete, Coriolus or Trametes, in particular *Coprinus cinereus f. microsporus* (IFO 8371), *Coprinus macrorhizus, Phanerochaete chrysosporium* (e.g. NA-12) or Trametes (previously called Polyporus), e.g., *T. versicolor* (e.g., PR4 28-A); or strains belonging to the subdivision Zygomycotina, class Mycoraceae, e.g., Rhizopus or Mucor, in particular *Mucor hiemalis*.

Laccases

The laccase may be derived from a fungi such as Collybia, Fomes, Lentinus, Pleurotus, Aspergillus, Neurospora, Podospora, Phlebia, e.g., *P. radiata* (WO 92/01046), Coriolus sp., e.g. *C. hirsitus* (JP 2-238885), or Botrytis.

Specifically contemplated laccases are the laccases derived from a strain of Polyporus sp., in particular a strain of *Polyporus pinsitus* or *Polyporus versicolor*, or a strain of Myceliophthora sp., e.g., *M. thermophila* or a strain of Rhizoctonia sp., in particular a strain of Rhizoctonia praticola or *Rhizoctonia solani*, or a strain of a Rhus sp., in particular *Rhus vernicifera*.

In a preferred embodiment of the invention the enzyme is a microbial laccase derived from a strain of genus Myceliophthora, such as a strain of the species *Myceliophthora thermophila*, e.g., the purified laccase described in WO 95/33836 from Novo Nordisk, which is hereby incorporated by reference.

In another preferred embodiment the enzyme is a laccase derived from a strain of the genus Polyporus, such as a strain of the species *P. pinsitus* laccase, especially the purified laccase described in WO 96/00290 from Novo Nordisk.

Other laccases include a Scytalidium sp. laccase, such as the *S. thermophilium* laccase described in WO 95/33837 (from Novo Nordisk Biotech inc.) or a Pyricularia sp. laccase, such as the *Pyricularia oryzae* laccase which can be purchased from SIGMA under the trade name SIGMA no. L5510, or a Coprinus sp. laccase, such as a *C. cinereus* laccase, especially a *C. cinereus* IFO 30116 laccase, or a Rhizoctonia sp. laccase, such as a *Rh. solani* laccase, especially the neutral *Rh. solani* laccase described WO 95/07988 (from Novo Nordisk A/S) having a pH optimum in the range from 6.0 to 8.5.

Laccase may be added in an effective amount. In an embodiment (as shown in the examples) the laccase may be the abovementioned *Polyporus pinsitus* laccase. A laccase may preferably be added in an amount of from 0.1 to 50 LACU/g DS flour, more preferably 0.2–10 LACU/g DS flour, even more preferably 0.5–5 LACU/g DS flour.

Bilirubin Oxidase

Bilirubin oxidases may be derived from a strain of Myrothecium sp., such as *M. verrucaria*. Bilirubin oxidase may be added in an effective amount.

L-amino acid oxidase

L-amino acid oxidase may be derived from a starin of Trichoderma sp. such as *Trichoderma harzianum*, such as the L-amino acid oxidase described in WO 94/25574 (from Novo Nordisk A/S), or *Trichoderma viride*. L-amino acid oxidase may be added in an effective amount.

Glucose Oxidase

A suitable glucose oxidase may originate from Aspergillus sp., such as a strain of *Aspergillus niger*, or from a strain of Cladosporium sp. in particular *Cladosporium oxysporum*, especially *Cl. oxysporum* CBS 163 described in WO 95/29996 (from Novo Nordisk A/S).

Glucose oxidase may be added in an effective amount. As shown in the examples below the glucose oxidase may be derived from *Aspergillus niger*. Glucose oxidase may preferably be added in amounts of 0.001–10,000 GODU/g DS flour, more preferably from 0.005–5,000 GODU/g DS flour, even more preferably from 0.01–2,000 GODU/g DS flour.

Hexose Oxidase

A hexose oxidases may be derived from the red sea-weed *Chondrus crispus* (commonly known as Irish moss) (Sullivan and Ikawa, (1973), Biochim. Biophys. Acts, 309, p. 11–22; Ikawa, (1982), Meth. in Enzymol. 89, carbohydrate metabolism part D, 145–149) oxidises a broad spectrum of carbohydrates, such as D-glucose, D-galactose, maltose, cellobiose, lactose, D-glucose 6-phasphate, D-mannose, 2-deoxy-D-glucole, 2-deoxy-D-galactose, D-fucase, D-glucurnic acid, and D-xylose. Also the red sea-weed Iridophycus flaccidum produces easily extractable hexose oxidases, which oxidise several different mono- and disaccharides (Bean and Hassid, (1956), J. Biol. Chem, 218, p. 425; Rand et al. (1972, J. of Food Science 37, p. 698–710). Hexose oxidase may be added in an effective amount.

Xylitol Oxidase

Another relevant oxidoreductase is xylitol oxidase (see, e.g., JP 80892242), which oxidises xylitol, D-sorbitol, D-galactitol, D-mannitol and D-arabinitol in the presence of oxygen. A xylitol oxidase can be obtained from strains of Streptomyces sp. (e.g., Streptomyces IKD472, FERM P-14339). Xylitol Oxidase may be added in an effective amount.

Sulfhydryl oxidase (SOX)

Glutathione oxidases or Sulfhydryl oxidases may be derived from Calodon and Cortinarius sp. (U.S. Pat. No. 4,610,963); or a sulfhydryl oxidase from Aspergillus, in particular A. niger (U.S. Pat. No. 5,529,926 and EP 321 811-A1), *Aspergillus awamori* or *Aspergills sojae;* or Penicillium, in particular *Penicillium ochrochloron*. Sulfhydryl oxidase may be added in an effective amount. As shown in the examples below the sulfdryl oxidase may be derived from *Penicillium ochrochloron.* Sulfhydryl oxidase may preferably be added in amounts of 0.001–5 milli SOX/ g DS flour, more preferably from 0.01–3 milli SOX/g DS flour, even more preferably from 0.1–2 milli SOX/g DS flour.

Pyranose oxidase

Examples of pyranose oxidases as described in JP 61177986 and include pyranose oxidases derived from strains of the genera Irpex, such as a strain from the species Irpex lacteus; Auriculariea, such as a strain of the species *Auricularia polytricha*, in particular *Auricularia polytricha* (FERM-P 7119), Coprinus, such as a strain of the species *Coprinus micaceus,* in particular *Coprinus micaceus* ATCC 20122; and Trametes, such as a strain of the species *Trametes cinnabarinus,* in particular *Trametes cinnabarinus* IFO 6139. Pyranose oxidase may be added in an effective amount.

Peroxidase

The peroxidase may be derived from plants (e.g., horseradish peroxidase) or microorganisms including fungi and bacteria such as a strain of Coprinus sp., such as *Coprinus cinereus* or *Coprinus macrorhizus,* or bacteria such as Bacillus, such as *Bacillus pumilus.* Peroxidase may be added in an effective amount.

The enzymes of the invention may be obtained from the microorganism in question by the use of any suitable technique. For instance, the enzyme preparation may be obtained by fermenting a microorganism and subsequently isolating the enzyme containing preparation from the fermented broth or microorganism by methods known in the art. According to the invention a more preferred embodiment is the use of recombinant DNA techniques as known in the art. Such methods normally comprise the cultivation of a host cell transformed with a recombinant DNA vector capable of expressing and carrying a DNA sequence encoding the enzyme in question. The host cell is grown in a culture medium under conditions permitting the expression of the enzyme, and is followed by the recovery of the enzyme from the culture.

Additionally the present invention relates to the use of the composition as previously described.

By the method of the invention at least two different fractions are obtained. There are various products that may comprise such fractions.

In one embodiment the obtained gluten may be added to wheat flour of poor quality, i.e., wheat flour having low gluten content. Accordingly, flour normally used for products, such as fodder may after fortification with gluten be used for the manufacture of products, such as bread. Consequently, the present invention presents a broadening of the types of available applications for flour having low gluten content.

The gluten fraction obtained by the method of the invention is applicable in any of the applications mentioned above and in a further aspect the present invention relates to a gluten fraction consisting essentially of gluten and to a product comprising said fraction.

Further, starches may be used in products of the adhesive, gypsum, paper, corrugating, mining and food industries. Starch and starch products may also be used as adhesive compounds, such as in the production of bags and adhesive tapes, laminates and wound tubes, wallpaper and poster glues, abrasive paper. Other applications include components of concrete retarders, sizing agents for synthetic, natural and mixed yarns in the textile industry, and thickeners for the printing of textiles.

In the pharmaceutical industry starch products may be used as disintegration agents in tablets and surgical glove is powder. Within the ceramic industry field the addition of starch increases the strength of the ceramic products. Starches may also be applied to detergents for the purpose of being dirt-deposit inhibitors. A completely different application is in the field of oil well drilling, wherein starch solutions may be used as agents to help seal drilling cores and to increase the viscosity of drilling mud and cooling water.

Yet another application of starch is for the use in water treatment plants serving the purpose of flocculating various aqueous suspensions.

A further application is in the plastic industry, wherein starches may be used to improve the biological degradation of plastic products.

Currently one of the applications of starch is for paint stripping using wheat starch blasting. Wheat starch blasting is a user-friendly blasting process wherein wheat starch can be used in systems designed for plastic media blasting (PMB), as well as systems specifically designed for wheat starch blasting. The wheat starch abrasive media is a crystallised form of wheat starch that is non-toxic, biodegradable, and made from renewable resources. The media is similar in appearance to plastic media, except that it is softer. Wheat starch is a plentiful natural resource that is biodegradable. Waste generated from this process may be treated in a bio-reactor using s amylase enzymes. The wheat starch blasting process may be used for removing coatings from both metallic and composite materials. This process is easy to control. It may be used to selectively remove from one and up to all coating layers. Wheat starch blasting does not cause fatigue to the substrate surface, and it allows for moderate stripping rates, whilst maintaining a gentle stripping action.

Materials & Mathods

Enzymes:

*Polyporus pinsitus* laccase: Disclosed in WO96/00290 from Novo Nordisk (available on request from Novo Nordisk, Denmark)

*Aspergillus niger* glucose oxidase (available on request from Novo Nordisk, Denmark).

*Penicillium ochrochloron* sulfdryl oxidase (available from Novo Nordiks, Denmark)

Glutomatic® System (Perten) (for washing out gluten from flour).

SOX Units (Sulfhydryl Oxidase Unit)

One sulfhydryl oxidase Unit is the amount of enzyme required to deplete 1 micromole of $O_2$ per minute from an assay mixture containing 30 mM L-cystein in 100 mM sodium phosphate at pH 6.0 and a temperature of 30° C. The oxygen was measured with an oxygen electrode conneted to an Oxi 3000 Oximeter (MTW).

Determination of Polyporus Laccase Activity (LACU)

Laccase activity is determined from the oxidation of syringaldazin under aerobic conditions. The violet colour produced is photometered at 530 nm. The analytical conditions are 19 micro M syringaldazin, 23.2 mM acetate buffer, pH 5.5, 30° C., 1 minute reaction time. 1 laccase unit (LACU) is the amount of enzyme that catalyses the conversion of 1.0 micro mole syringaldazin per minute under these conditions.

Determination of Glucose Oxidase Activity (GODU)

1 GODU is defined as the amount of enzyme which, under standard conditions, catalyses the formation of 1 micromole of $H_2O_2$ per minute. The analytic method AF266 is available upon request from Novo Nordisk A/S).

Determination of Peroxidase Activity Units (POXU)

Peroxidase activity is measured in POXU/ml. (1 POXU (peroxidase unit) is defined as the amount of enzyme that catalyses the conversion of 1 micro mole $H_2O_2$ per minute in a system where 2,2'-azinobis[3-ethylbenzothiazoline-6-sulfonate] is oxidised in the presence of 1 mM $H_2O_2$, pH 7.0, at a temperature of 40° C.)

A. The Enzyme Treatment a. 100 g of wheat flour (type Pelikkan 441/1 from Meneba Meel BV, Holland) is mixed, using the Hobart mixer at speed III (high speed) with 70 mL of tap city water (ca. 20° dH) including added enzyme solution. The water temperature is 37° C.±2° C. The specific enzyme and dosage hereof is described under each example.

b. The Hobart Mixer is applied on the pre-dough at speed III (high speed) for 2 minutes.

c. The 170 g of dough rested for 8 to 40 minutes at 37° C. in the mixing cup, which is placed in a water bath.

Thereby the enzyme reaction time is the resting time plus the mixing time (approximately 3 minutes) for all the tests. Some further enzyme reaction time is possible during the dough washing (see B. Preparation of gluten) below. However the dough is washed continuously with water at 37° C., so that the part of the enzyme that is not attached to the substrate is washed out rather quickly.

B. Preparation of Gluten

The Glutomatic System (Perten Instruments AB, Sweden) consists of Glutomatic 2200 mixing and gluten washing device used for preparing a wet sample of gluten. This sample is at flourmills used for determining gluten quantity and quality quantified as the gluten index by sieve-centrifugation using a Glutomatic Centrifuge 2015. The index value characterizes the gluten as being weak, normal or strong.

The Glutomatic 2200 gluten washer consists of a washing chamber, and a powerful stirrer. The washing and stirring is performed by continuous addition of water. The wash water including suspended starch particles leaves the washing chamber through an 88-micron filter at the same continuous flow rate at which fresh water was added.

2. 20.0 g of dough prepared as described above is placed in the mixing cup and 4.2 mL water is added.

3. The stirring and continuous flow of water is performed for 30 minutes using a flow rate of 46.3 mL/minute. Water heated to 37° C.±2° C. was used.

4. The washed piece of gluten was weighed and evaluated visually for elasticity.

5. The piece of gluten was freeze-dried using conventional freeze-drying technique and weighed. The weight of dried gluten in relation to the weight of the wet gluten sample is equivalent to the dry matter content.

6. The dried gluten was grinded to a fine powder using a mortar for 15 minutes, and it was assayed by the micro baking test.

C. Assay for Measuring Gluten Quality by Micro Baking Tests

One to five days before the test begins portions of 12 g flour+gluten was equilibrated at 30° C. Solutions of salt and sugar were prepared. Also a solution of the yeast was prepared (see the table below) and stored in refrigerator.

The mass and volume of ingredients for the single breads are the following:

| Ingredients | Mass or volume |
| --- | --- |
| Flour | 12.0 g |
| Water (from the city) | 4.3 mL |
| Yeast solution (40 g + 60 mL water) | 1.2 mL |
| Solution of 10.8 g sugar + 10.8 g salt + 64.2 mL water | 2.5 mL |
| Gluten (2% w/w of the amount of flour) | 0.24 g |

1. To a thermo-equilibrated kettle (25–30° C.) 12.24 g of flour including gluten, the yeast solution, the salt plus sugar solution and water is added (in this order). The kettle is the mixer device for the Micro Mixer type NSI-33R that is used.

2. The kettle was mounted on the micro-mixer and kneading is performed for 3.0 minutes.

3. 18.0 g of the dough is weighed and kneaded by hand. The temperature in the dough must be 27–29° C. The dough is flatten out and shaped using a long rolling pin and it rested for 15 minutes at 28–29?C.

4. It is again rolled and shaped using the special long rolling pin and it rested for 10 minutes at 28° C.

5. Finally it is rolled out again and shaped to bread using the special long rolling pin. The dough is then placed in a 37 mL baking tin and placed in a conditioning cabinet at 32.0° C., and 86% relative humidity (RH) for 45 minutes.

6. It was then baked in the oven at 230° C. for 13 minutes.

7. After cooling the volume of the bread was weighed and measured using a "mini-PUP size" volume-measuring device. The baking result was presented as the specific bread volume (mL/g). The higher the specific bread volume the better is the baking effect of the gluten.

In the following examples the enzyme treatment, the preparation of gluten and the assay for measuring gluten quality by micro baking tests were used. The enzymes used and the results of the tests are mentioned under each example.

EXPERIMENTALS

The following are examples of methods of separation of wheat flour using enzymes. FIG. 1 is an illustration of the steps in one of the possible separation processes and FIG. 2 is an example of a decanter process for the separation of wheat flour.

Example 1

5 kg of wheat flour is mixed with 3.5 L of water having at temperature of 25° C. The enzyme of Polyphenol oxidase-Laccase is added.

The dough is resting for approximately 8 minutes followed by the addition of 5 L of water. The dough suspension is mixed for approximately 18 minutes. After mixing the dough suspension is diluted with 4 L of water and is circulated for 20 minutes. The diluted dough suspension is then separated on screens by addition of water.

The fractions obtained are gluten, hemicellulose and starch fractions.

Example 2

200 kg of wheat flour is mixed with 400 L of water. The enzyme of Polyphenol oxidase-Laccase is added.

The dough is continuously pumped into a homogeniser at 30–50 bar and is homogenised at a temperature of approximately 35° C. After homogenising, the mixture is passed through a decanter centrifuge separating the mixture into a supernatant fraction and a pellet fraction. The supernatant comprises the gluten and the pellet comprises the starch. The supernatant is kept in a tank at a pH of approximately 7.0, and is then passed onto a 150 sieve. The gluten of the supernatant is thereby separated from the effluent. The wet gluten is freeze dried and milled.

The A-starch (sediment) is liquefied and subsequently saccharified and made into syrup.

Example 3

Test of Laccase

Enzyme treatment, preparation of gluten and baking test are shown in table 1.

The washing of the gluten was performed at approximately 22° C.

TABLE 1

Effect of laccase treatment of the flour.

| Enzyme | Type | Dosage of enzyme activity. LACU/g Dry matter of flour | Resting time, minutes | Dry matter of wet gluten, % w/w | Baking test Specific volume of bread, mL/g |
|---|---|---|---|---|---|
| Laccase | Polyporus pinsitus | 1.1 | 40 | 33.3 | 3.29 |
| Laccase | Poly- | 3.0 | 40 | 32.2 | 3.33 |

TABLE 1-continued

Effect of laccase treatment of the flour.

| Enzyme | Type | Dosage of enzyme activity. LACU/g Dry matter of flour | Resting time, minutes | Dry matter of wet gluten, % w/w | Baking test Specific volume of bread, mL/g |
|---|---|---|---|---|---|
| | porus pinsitus | | | | |
| No enzyme | | 0 | 40 | 33.9 (average of 3 tests) | 3.26 |

A clear effect of the laccase treatment was seen, as illustrated by the dosage response trial.

Example 4

Test of Sulfhydryl Oxidase

The specific activity of the *Penicillium ochrochloron* sulfhydryl oxidase was 5.12 SOX/A-280. A preparation having an activity of 6.45 SOX/mL was used. Enzyme treatment, preparation of gluten and baking test are shown in table 2.

The washing of the gluten was performed at approximately 37.7–38.1° C.

TABLE 2

Effect of sulfhydryl oxidase

| Enzyme | Type | Dosage of enzyme activity. Milli SOX/g Dry matter of flour | Resting time, minutes | Dry matter of wet gluten, % w/w | Baking test Specific volume of bread, mL/g |
|---|---|---|---|---|---|
| Sulfhydryl oxidase | Penicillium ochrochloron | 1.0 | 10 | 34.0 | 3.36 |
| Sulfhydryl oxidase | Penicillium ochrochloron | 1.0 | 45 | 33.9 | 3.38 |
| No enzyme | | 0 | 40 | 33.9 (average of 3 tests) | 3.26 |

The wet gluten produced by use of sulfhydryl oxidase was found extraordinary elastic when evaluated by the visual test

Example 5

Test of Glucose Oxidase

Enzyme treatment, preparation of gluten and baking test are shown in table 3.

The washing of the gluten was performed at 36.1–37.8° C. The enzyme preparation Novozym™ 771 (batch no. OGN 00002) (*Aspergillus niger* GOX) was analyzed to 1639

GODU/g according to the internal analyses procedure EAL-SM-0244 (available on request from Novo Nordisk).

TABLE 3

Effect of glucose oxidase

| Enzyme | Type | Dosage of enzyme activity. GODU/g Dry matter of flour | Resting time, minutes | Dry matter of wet gluten, % w/w | Baking test Specific volume of bread, mL/g |
|---|---|---|---|---|---|
| Glucose oxidase | Novozym 771 from Aspergillus niger | 0.010 | 10 | 33.4 | 3.35 (average of 2 tests) |
| Glucose oxidase | Novozym 771 from Aspergillus niger | 0.010 | 45 | 34.4 | 3.35 (average of 2 tests) |
| Glucose oxidase | Novozym 771 from Aspergillus niger | 0.100 | 10 | 34.1 | 3.28 (average of 2 tests) |
| Glucose oxidase | Novozym 771 from Aspergillus niger | 0.100 | 45 | 33.9 | 3.28 (average of 2 tests) |
| No enzyme | | 0 | 40 | 33.9 | 3.26 (average of 3 tests) |

An increasing effect of the specific volume of the bread is clearly seen as a result of the treatment with the glucose oxidase.

What is claimed is:

1. A method for the separation of flour into one gluten fraction and at least one other fraction, comprising the steps of:
    a) mixing the flour and a liquid to obtain a dough,
    b) separating the dough into a fraction comprising gluten and at least one other fraction,
    c) recovering at least the gluten fraction, characterized in that an oxidoreductase is added at any of steps a), b) or c).

2. A method of claim 1, comprising the steps of:
    a) mixing the flour and a liquid and at least one oxidoreductase enzyme obtaining a dough,
    b) separating the dough into a fraction comprising gluten and at least one other fraction,
    c) recovering at least the gluten fraction.

3. The method according to claim 1, wherein the step a) comprises
    a1) mixing the flour and the at least one oxidoreductase enzyme obtaining a mixture, and
    a2) adding the liquid to the mixture.

4. The method according to claim 1, wherein the step a) comprises
    a3) mixing the flour and the liquid, followed by
    a4) adding the at least one enzyme.

5. The method of claim 1, wherein the flour is wheat flour.

6. The method according to claim 1, wherein the gluten fraction consist essentially of gluten.

7. The method according to claim 1, wherein the other fractions consist of essentially no gluten.

8. The method according to claim 1, wherein one of the other fractions comprises starch.

9. The method according to claim 1, wherein the dough is resting prior to separation.

10. The method according to claim 1, wherein the dough is diluted prior to separation.

11. The method according to claim 1, wherein the dough is homogenised prior to separation.

12. The method according to claim 1, wherein the dough is separated by the means of sieving.

13. The method according to claim 1, wherein the dough is separated by the means of a decanter centrifuge.

14. The method according to claim 1, wherein the dough is separated by the means of a hydrocyclone.

15. The method according to claim 1, wherein the recovered gluten fraction is subsequently dried.

16. The method according to claim 1, wherein the enzymes are selected from the group consisting of peroxidase, laccase, glutathione oxidase, glucose oxidase, pyranose oxidase, hexose oxidase, L-amino acid oxidase and lysyl oxidase alone or in combination.

17. The method according to claim 15, wherein the enzymes are selected in combination with an enzyme selected from the group consisting of hemicellulase, cellulase, xylanase, proteases and dehydrogenases.

18. The method according to claim 1, wherein the enzymes are from fungal or bacterial origin.

19. The method according to claim 1, wherein the step a) comprises mixing the flour and a liquid obtaining a dough, resting the dough, and adding at least one oxidoreductase enzyme to the dough.

20. The method according to claim 1, wherein the dough has a pH value of between 4.5 and 8.0.

21. The method according to claim 1, wherein the dough has a temperature of between 10 and 60° C.

* * * * *